United States Patent
Gläser et al.

(10) Patent No.: US 6,523,841 B2
(45) Date of Patent: Feb. 25, 2003

(54) TWIST-BEAM AXLE FOR MOTOR VEHICLES

(75) Inventors: Klaus Gläser, Salzkotten (DE); Wigbert Christophliemke, Schloss Holte-Stukenbrock (DE); Dieter Etzold, Oerlinghausen (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/871,249

(22) Filed: May 31, 2001

(65) Prior Publication Data

US 2002/0005622 A1 Jan. 17, 2002

(30) Foreign Application Priority Data

May 31, 2000 (DE) .................................. 200 09 689 U
Jul. 11, 2000 (EP) ................................. 00114824

(51) Int. Cl.⁷ ............................................. B60G 21/05
(52) U.S. Cl. ........................ 280/124.106; 280/124.166; 301/124.1; 29/897.2
(58) Field of Search .................. 280/124.106, 124.107, 280/124.116, 124.166; 301/127, 124.1; 29/897.2

(56) References Cited

U.S. PATENT DOCUMENTS

| | | | | |
|---|---|---|---|---|
| 4,173,501 A | * | 11/1979 | Hildebrandt et al. | 148/224 |
| 4,232,881 A | * | 11/1980 | Kolbel et al. | 280/721 |
| 5,324,073 A | * | 6/1994 | Alatalo et al. | 280/723 |
| 5,370,751 A | * | 12/1994 | von Hagen et al. | 148/330 |
| 5,518,265 A | * | 5/1996 | Buthala et al. | 280/723 |
| 5,800,024 A | * | 9/1998 | Steimmel et al. | 301/127 |
| 5,909,888 A | * | 6/1999 | Betz et al. | 280/124.166 |
| 6,065,813 A | * | 5/2000 | Fett et al. | 301/124.1 |
| 6,149,198 A | * | 11/2000 | Klaas | 280/798 |
| 6,152,468 A | * | 11/2000 | Glaser et al. | 280/124.134 |

FOREIGN PATENT DOCUMENTS

| | | |
|---|---|---|
| DE | 297 20 207 U1 | 2/1998 |
| EP | 0 249 537 | 12/1987 |

* cited by examiner

Primary Examiner—Paul N. Dickson
Assistant Examiner—Laura B. Rosenberg
(74) Attorney, Agent, or Firm—Henry M. Feiereisen

(57) ABSTRACT

A twist-beam axle for motor vehicles, includes two longitudinal control arms, and a transverse strut interconnecting the longitudinal control arms, wherein the transverse strut and/or the longitudinal control arms is/are partially hardened.

5 Claims, 2 Drawing Sheets

TWIST-BEAM AXLE FOR MOTOR VEHICLES

CROSS-REFERENCES TO RELATED APPLICATIONS

This application claims the priorities of German Patent Application, Serial No. 200 09 689.3, filed May 31, 2000, and European Patent Application, Serial No. 00 114 824.6, filed Jul. 11, 2000, the subject matter of which is incorporated herein by reference.

BACKGROUND OF THE INVENTION

The present invention relates, in general, to a twist-beam axle, in particular to a twist-beam rear axle of a type having two longitudinal control arms interconnected by a transverse strut.

Twist-beam axles, in particular a twist-beam rear axles, combine the advantages of a single structure with slight specific gravity and good kinematic properties. The transverse strut for interconnecting the longitudinal control arms acts as torsion bar so as to implement a characteristic of a longitudinal arm upon simultaneous compression and a characteristic of a semi-trailing arm upon reciprocal compression.

Various proposals have been made to so configure the transverse strut of a twist-beam rear axle as to be rigid on one side and to provide sufficiently low degree of torsional stiffness on the other side (cf. European Pat. No. EP 0 149 537 B1 or German patent specification DE 297 20 207 U1). Manufacture of these transverse struts is, however, very complex so that production costs of a complete twist-beam axle are increased.

It would therefore be desirable and advantageous to provide an improved twist-beam axle to obviate prior art shortcomings and to meet the increasing demand for better performance as well as longer service life of twist-beam axles, while yet reducing costs at the same time.

SUMMARY OF THE INVENTION

According to one aspect of the present invention, a twist-beam axle for motor vehicles, includes two longitudinal control arms, and a transverse strut interconnecting the longitudinal control arms, wherein at least one member selected from the group consisting of the transverse strut and longitudinal arms is partially hardened.

The present invention resolves prior art problems by partially hardening the transverse strut and/or the longitudinal control arms, so that the twist-beam axle can be made in predetermined areas with a strength which is best suited to the situation at hand. The twist-beam axles is characterized by yielding force and moment transitions with a dynamic power flow without power peaks in critical structural components, in particular in the transition zones from transverse strut to longitudinal control arm or the transitions from the cross section of the transverse strut of low degree of torsional stiffness to the cross section of the transverse strut of high degree of torsional stiffness.

Suitably, the transition zones and the axial ends and/or the transitions from the cross section of low degree of torsional stiffness to the cross section of high degree of torsional stiffness are hardened. In this manner, the stiffness is increased in a targeted manner upon plastic deformation at the ends and the transitions of the transverse strut, whereas the mid-section of the transverse strut has a low degree of torsional stiffness.

Torsional loads and bending forces, encountered during operation, are absorbed by the longitudinal control arms and conducted into the transverse strut for compensation in the section of low degree of torsional stiffness. Thus, the twist-beam axle exhibits a particularly good static and dynamic load behavior and attains a long service life.

A targeted heat treatment after shaping enables exploitation of the good shaping properties of the material, and, after heat treatment, of the high mechanical values for the properties of the component. The generated mechanical values and the material structure can be adjusted component-specifically by the controlled heating and controlled quenching processes. Thus, a twist-beam axle according to the present invention has a maximum dynamic service life and high resistance against buckling.

A twist-beam axle according to the invention can be made at minimum energy consumption while yet being of high quality. The partial hardening has the added advantage of allowing the use of an easily shapeable and cost-efficient material which receives, after shaping, a strength which is best suited to the situation at hand through heat-treatment.

In the description, the term "heat treatment" denotes any operation, or combination of operations, involving heating and cooling of a metal component to obtain certain desirable properties. Examples include hardening or tempering.

Taking into account large-scale production, a particularly effective process involves induction hardening. The hardening process can be integrated into the running operation. Material properties can be suited to the intended application by the heat treatment. Difficulties to provide desired hardness and internal tensions can be influenced through structural transformation. The inductive process allows to focus the heat treatment upon one or more areas of the entire surface of the twist-beam axle. The heat treatment can be limited to the zones that are actually intended for hardening. Hardening results are even and always reproducible.

An induction unit can easily be automated and ensures a clean operation. As the unit requires little space, it can be placed directly into the assembly line, thereby avoiding cost-intensive material transports.

According to another feature of the present invention, the hardening process is performed under an inert atmosphere. The inert atmosphere can be maintained throughout the entire hardening process, including the subsequent quenching process. This is advantageous, as the production is simplified and results in a cost reduction. The inert atmosphere during heat treatment protects oxygen-sensitive steel from exposure to oxygen and water vapor from the ambient air.

As a consequence of carrying out the hardening process under complete inert atmosphere, the transverse strut can be subsequently painted, without requiring additional surface treatment, such as, for example, surface blasting. Moreover, the inert atmosphere prevents an additional surface decarburization of the transverse strut. Thus, the service life of the transverse strut and the service life of a twist-beam axle can be increased.

Hardening imparts the material of the transverse strut with a local or thorough increase in hardness. Heating and subsequent cooling (quenching) realizes formation of a martensitic structure of the transverse strut in the hardened zones. Of course, a controlled hardening process allows also production of any other desired material structure. Basically, also laser heating may be used.

Examples for use as material for the transverse strut and also the longitudinal control arms include hardenable steels, for example, steel with the designation 22MnB5.

Partial hardening may be carried out to implement intended variations of the hardness value over the length of the transverse strut by a suitable process control, so that the hardness values gradually increase or decrease and thus enhance the dynamic stability.

According to another feature of the present invention, the transverse strut may have over a major portion of its length a V-shaped or U-shaped cross section. In this way, the dynamic stability can be improved while reducing the weight of the rear axle. This measure realizes an improvement of the running behavior, in particular of the camber change and lane change during alternating slip in and/or turn-in behavior of the twist-beam rear axle during negotiation of curves. Suitably, the transverse strut is made of a hollow profile with hardened ends and cross section of high degree of torsional stiffness, whereas a mid-section of the transverse strut has a U-shaped or V-shaped double-walled cross section of low degree of torsional stiffness. The transitions from the cross section of high degree of torsional stiffness to the cross section of low degree of torsional stiffness are gradual, and, as stated above, heat treated. In this way, forces in the transverse strut are better distributed.

Of course, the transverse strut may also be of single-wall configuration and have a U shape or V shape throughout. Also a steel construction comprised of two joined shells is possible. A partial foaming in the transition zones is, optionally, conceivable to realize a symbiosis of hardened profile and internal support by foaming. Such a twist-beam axle attains a highly dynamic load behavior.

A twist-beam axle according to the present invention is characterized by a dynamic load behavior at high resistance against buckling and by a very long service life.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
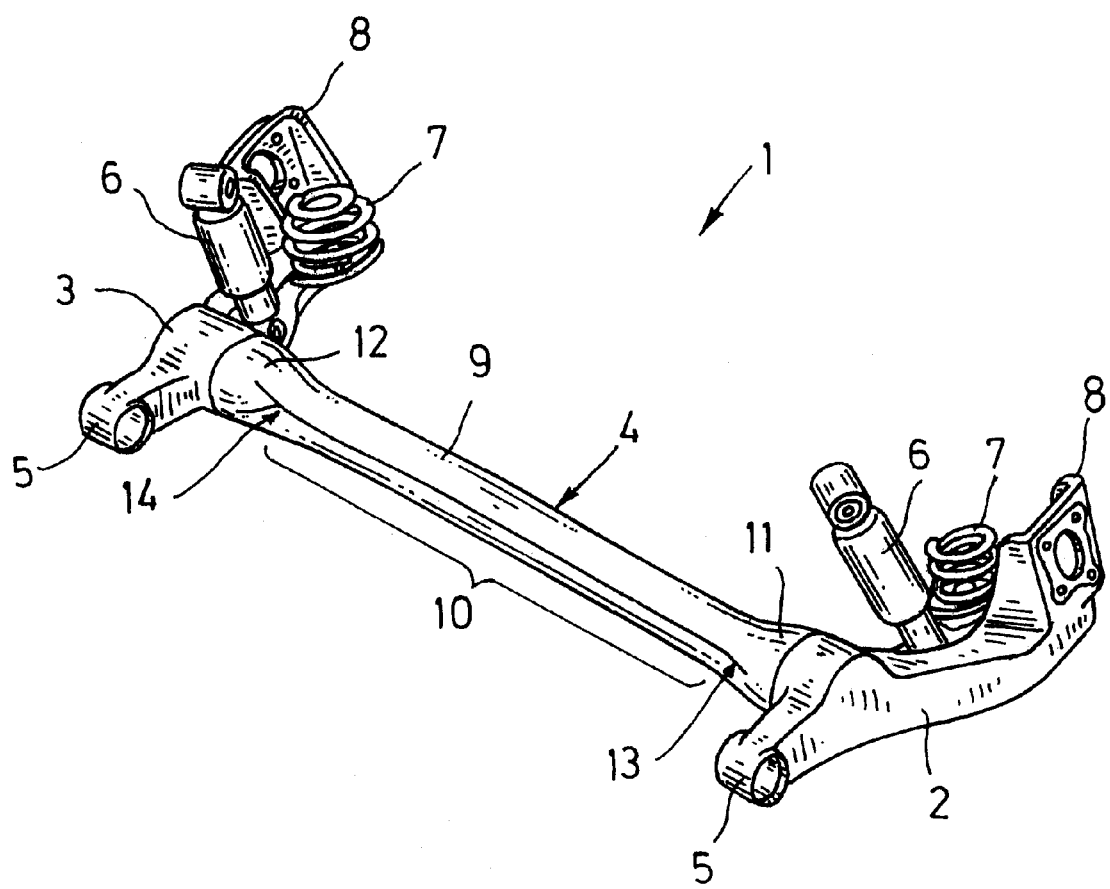
FIG. 1 shows a perspective illustration of a twist-beam axle, embodying the present invention.

Turning now to FIG. 1, there is shown a perspective illustration of a twist-beam axle, generally designated by reference numeral 1 and embodying the present invention. The twist-beam axle 1 includes two longitudinal control arms 2, 3 and a transverse strut 4 interconnecting the longitudinal control arms 2, 3. The longitudinal control arms 2, 3 are designed as tubular members. Each of the longitudinal control arms 2, 3 is provided at its forward end with a mounting eye 5 for elastic articulation of the vehicle body, not shown. Shock absorbers 6 and springs 7 are disposed between the longitudinal control arms 2, 3 and the vehicle body. At their rear end, the longitudinal control arms 2, 3 are provided with receptacles 8 for connection of a, not shown, wheel carrier for support of a wheel.

Figure 2:
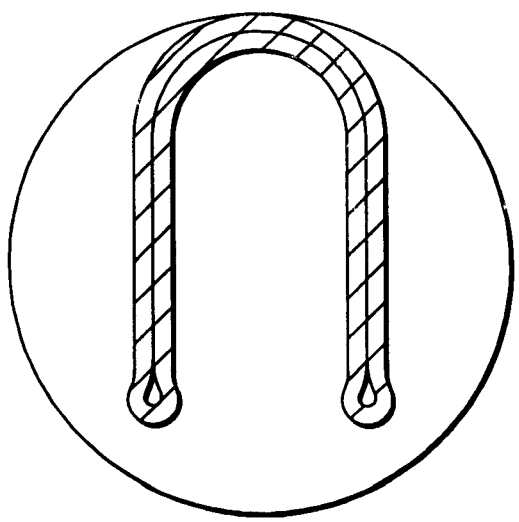
FIG. 2 is a sectional view of one variation of a transverse strut for the twist-beam axle according to the present invention.
Figure 3:
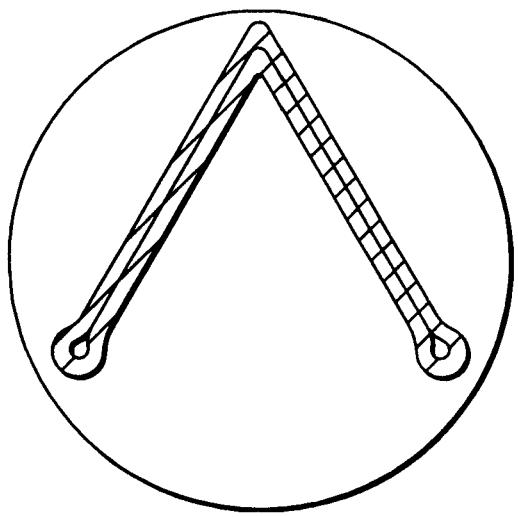
FIG. 3 is a sectional view of another variation of a transverse strut for the twist-beam axle.

The transverse strut 4 has a tubular profile 9, with a mid-section 10 (torsional zone) having a cross section of low torsional stiffness, and with axial ends 11, 12 having a cross section of high torsional stiffness. The transitions between the mid-section 10 to the axial ends 11, 12, i.e. the transitions from the cross section of low torsional stiffness to the cross section of high torsional stiffness is gradual. As shown in FIG. 2, the transverse strut may have a U-shaped cross section of a major portion of its length, or, as shown in FIG. 3, a V-shaped cross section.

The transverse strut 4 is partially hardened in the area of the ends 11, 12 and the transitions 13, 14. As a consequence, the material of the transverse strut 4 is provided with a local and thorough increase in hardness in those areas. The longitudinal control arms 2, 3 and the transverse strut 4 of the twist-beam axle 1 may be made of easily shapeable material, for example of hardenable steel 22MnB5, which is imparted subsequently in the highly-stressed regions with sufficient strength properties to meet demands at hand.

Suitably, the partial hardening is implemented through inductive heating with subsequent quenching. In this way, even hardness values and hardness patterns can be reproducibly realized. By carrying out the hardness process under an inert atmosphere, the stiffness is increased in a targeted way during plastic deformation at the ends 11, 12 and transitions 13, 14 of the transverse strut 4. In the mid-section 10, the transverse strut 4 has, however, a low degree of torsional stiffness.

While the invention has been illustrated and described as embodied in a twist-beam axle for motor vehicles, it is not intended to be limited to the details shown since various modifications and structural changes may be made without departing in any way from the spirit of the present invention.

What is claimed as new and desired to be protected by Letters Patent is set forth in the appended claims:

1. A twist-beam axle for motor vehicles, comprising two longitudinal control arms, and a transverse strut interconnecting the longitudinal control arms, wherein at least one member selected from the group consisting of the transverse strut and longitudinal control arms is partially hardened, wherein the transverse strut has an area of low degree of torsional stiffness and opposite ends adjacent the longitudinal control arms of high degree of torsional stiffness, whereby the area of low torsional stiffness and the ends of high degree of torsional stiffness are connected by a transition zone, wherein at least one member selected from the group consisting of the ends of the transverse strut and the transition zones of the transverse strut are hardened.

2. The twist-beam axle of claim 1, wherein the member is hardened through induction.

3. The twist-beam axle of claim 1, wherein the member is hardened under an inert atmosphere.

4. The twist-beam axle of claim 1, wherein the transverse strut is defined by a length, wherein a major portion of its length has a V-shaped cross section.

5. The twist-beam axle of claim 1, wherein the transverse strut is defined by a length, wherein a major portion of its length has a U-shaped cross section.

* * * * *